US009843906B2

(12) United States Patent
Du et al.

(10) Patent No.: US 9,843,906 B2
(45) Date of Patent: Dec. 12, 2017

(54) APPARATUS AND METHOD FOR RETRIEVING GROUP MESSAGES

(71) Applicant: MOTOROLA SOLUTIONS, INC., Schaumburg, IL (US)

(72) Inventors: Quan-Wen Du, Sichuan (CN); Guo-Jin Wei, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 168 days.

(21) Appl. No.: 14/910,534

(22) PCT Filed: Aug. 13, 2013

(86) PCT No.: PCT/CN2013/081412
§ 371 (c)(1),
(2) Date: Feb. 5, 2016

(87) PCT Pub. No.: WO2015/021606
PCT Pub. Date: Feb. 19, 2015

(65) Prior Publication Data
US 2016/0183065 A1    Jun. 23, 2016

(51) Int. Cl.
*H04W 4/08* (2009.01)
*H04W 4/10* (2009.01)
*H04L 25/20* (2006.01)

(52) U.S. Cl.
CPC ............ *H04W 4/08* (2013.01); *H04L 25/20* (2013.01); *H04W 4/10* (2013.01)

(58) Field of Classification Search
CPC ........... H04W 4/06; H04W 4/08; H04W 4/10; H04W 84/047
See application file for complete search history.

(56) References Cited

U.S. PATENT DOCUMENTS

| 5,764,875 A | 6/1998 | Badovinatz et al. |
| 5,790,772 A | 8/1998 | Badovinatz et al. |

(Continued)

FOREIGN PATENT DOCUMENTS

| CN | 1747357 | 3/2006 |
| CN | 101106779 | 1/2008 |

(Continued)

OTHER PUBLICATIONS

PCT/CN2013/081412 International Search Report and Written Opinion dated Jun. 9, 2014 (11 pages).

*Primary Examiner* — Scott M Sciacca

(57) ABSTRACT

A repeater receives a first group message directed to a talk group. The repeater assigns a first unique message identifier including a generated first sequence number to the first group message. The repeater broadcasts the first group message with the first unique message identifier and the unique talk group address to the talk group. The repeater later receives a second group message directed to the talk group, generates a second sequence number from the generated first sequence number, assigns a second unique message identifier including the second sequence number to the second group message and broadcasts the second group message to the talk group. The first sequence number and the second sequence number may be used by a receiving radio of the talk group to determine if the radio failed to receive one or more group messages or if a received group messages is a duplicate message.

19 Claims, 12 Drawing Sheets

(56) References Cited

U.S. PATENT DOCUMENTS

| | | | |
|---|---|---|---|
| 5,799,146 A | 8/1998 | Badovinatz et al. | |
| 6,498,787 B1 * | 12/2002 | Yi | H04M 15/58 370/328 |
| 6,507,586 B1 | 1/2003 | Satran et al. | |
| 6,842,461 B2 * | 1/2005 | Harris | H04L 1/0001 370/465 |
| 6,937,585 B2 * | 8/2005 | Proctor | H04L 1/165 370/335 |
| 6,959,323 B1 | 10/2005 | Tzeng et al. | |
| 7,512,630 B2 | 3/2009 | Kling et al. | |
| 7,936,759 B2 | 5/2011 | Kritayakirana et al. | |
| 8,199,740 B2 | 6/2012 | Dabbs, III et al. | |
| 8,285,792 B2 | 10/2012 | Itoh | |
| 8,351,365 B2 | 1/2013 | Seok | |
| 8,856,003 B2 * | 10/2014 | Chong | H04W 4/10 379/67.1 |
| 9,042,356 B2 | 5/2015 | Chowdhary et al. | |
| 2007/0110087 A1 * | 5/2007 | Abel | H04L 45/00 370/412 |
| 2007/0263631 A1 | 11/2007 | Mallory | |
| 2010/0085952 A1 * | 4/2010 | Wiatrowski | H04B 7/15542 370/341 |
| 2012/0093068 A1 * | 4/2012 | Okuda | H04B 7/155 370/315 |
| 2013/0094429 A1 | 4/2013 | Seok | |
| 2014/0051450 A1 * | 2/2014 | Tomita | H04W 36/0055 455/439 |

FOREIGN PATENT DOCUMENTS

| | | | |
|---|---|---|---|
| CN | 101569214 | 10/2009 | |
| CN | 102771059 | 11/2012 | |
| CN | 102891941 | 1/2013 | |
| WO | WO 2012129784 A1 * | 10/2012 | H04W 4/08 |

* cited by examiner

APPARATUS AND METHOD FOR RETRIEVING GROUP MESSAGES

BACKGROUND OF THE INVENTION

Public safety agencies, for example, emergency first responder organizations, such as police or fire departments, or public works organizations may use two way radios to communicate. Examples of two way radios include portable two-way radios, mobile radios, or other similar voice communication entities that communicate with one another via wired and/or wireless networks. Two way radio systems have a group message feature where a voice or data message sent from one radio is broadcast to multiple radios associated with a talk group. However there is currently no method for a receiving radio to know whether it missed a group message.

Consider an example where a supervisor sends an assignment via a talk group message to radios assigned to employees and associated with a talk group. If during the time the message is sent, one or more of receiving radio(s) assigned to the talk group are, for example, out of a coverage area where the radios operate, working on a different frequency, or powered off (in other words, one or more of the radios assigned to the talk group is incapable of receiving the talk group message at a particular time), those receiving radios will not receive the talk group message. Later, when each of those receiving radios becomes capable of receiving the talk group message by, for example, returning to the coverage area, tuning in to the correct frequency or being powered on, there is no mechanism for either the sending radio or the receiving radio that was previously incapable of receiving the talk group message to determine that the receiving radio failed to receive the talk group message(s) that were sent during the period when that radio was incapable of receiving the talk group message.

In addition, there are times when a sending radio may want to resend a group message. Consider an example where the sending radio receives an indication from one or more receiving radios that those receiving radios failed to receive a talk group message that was otherwise successfully sent to the rest of the talk group. The sending radio may choose to resend the message to the talk group rather than responding individually to each receiving radio from which an indication was received. When the sending radio resends the talk group message, there is also no way for the receiving radios, including those receiving radios that successfully received the original talk group message, to determine whether the resent talk group message is a duplicate message or a new message.

Accordingly, there is a need for an improved method and apparatus for enabling a receiving radio to automatically retrieve a missed talk group message and/or identify a duplicate talk group message.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
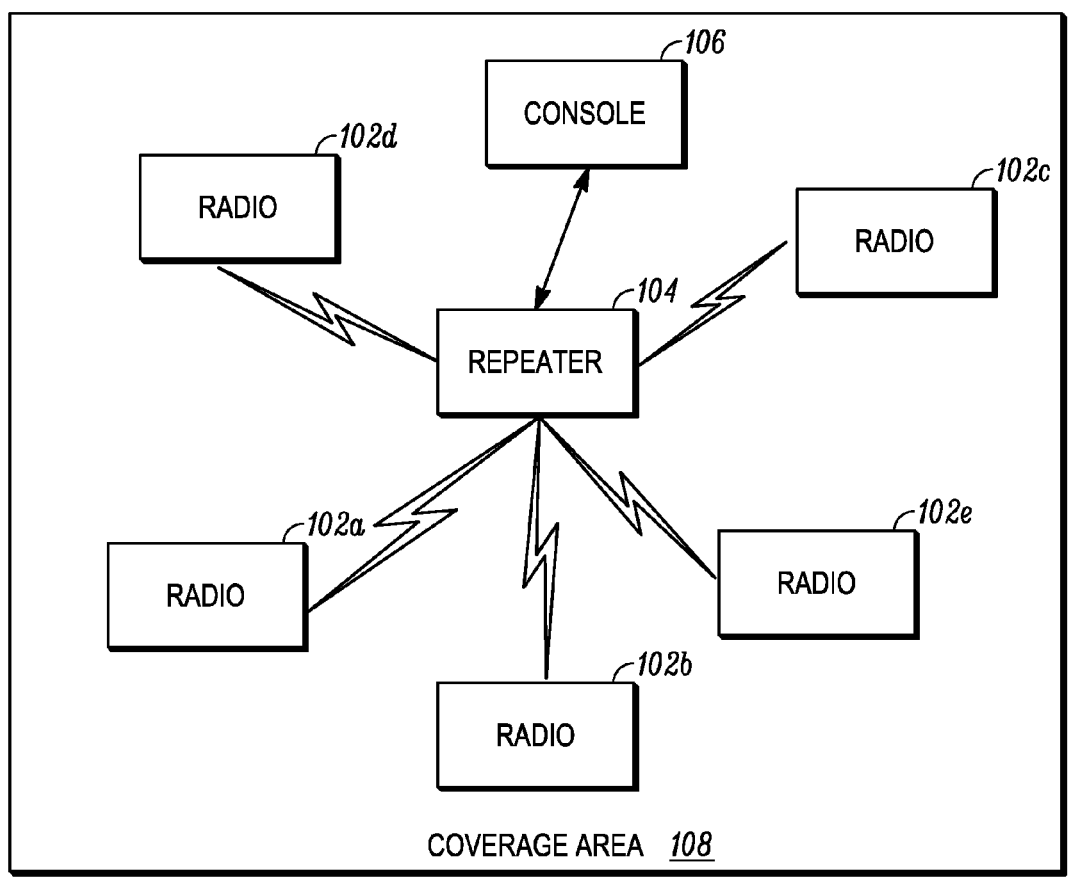
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for receiving, by a repeater, a first group message directed to a talk group and including a talk group address uniquely identifying the talk group. The repeater assigns a first unique message identifier including a generated first sequence number and the talk group address to the first group message when the first group message is in a message sequence associated with the talk group. The repeater broadcasts the first group message with the first unique message identifier to the talk group. The repeater later receives a second group message directed to the talk group, generates a second sequence number from the generated first sequence number assigned to the first group message, assigns a second unique message identifier including the second sequence number and the talk group address to the second group message and broadcasts the second group message with the second sequence number to the talk group. The first sequence number assigned to the first group message and the second sequence number assigned to the second group message may be used by a receiving radio member of the talk group to determine if the receiving radio failed to receive one or more group messages broadcast by the repeater or if one or more received group messages is a duplicate message.

FIG. 1 is a block diagram of a system used in accordance with some embodiments. System 100 includes radios 102 (i.e., radios 102a, 102b, 102c, 102d, and 102e), at least one repeater 104 and an optional console 106. Radios 102 may be, for example, portable radios, mobile radios, fixed station radios, or virtual radios like consoles, used to communicate with other radios and interface to a network. Radios 102 may include a group message feature, wherein when two or more radios are associated with a talk group, a voice or data message sent from each radio associated with the talk group is broadcast to all other radios in the talk group. Repeater 104 is a network component that provides radio frequency coverage to a specified area, for example, coverage area 108. Repeater 104 is configured to receive a voice or data message from one of radios 102 and broadcast/retransmit the message to the other radios in the group within the coverage area 108.

Consider an example where each of radios 102a-102e is associated with a talk group. Repeater 104 broadcasts a voice or data message sent from one of radios 102a-102e to all of the other radios in the talk group. For example, when radio 102a sends a first group message, the first group message is initially sent from radio 102a to repeater 104. The message may include a talk group address that uniquely identifies the talk group. A sequence number value associated with the first group message sent from radio 102a to repeater 104 is initially set to a null value, thereby indicating to repeater 104 that the first group message is a group message that has not previously been sent to the talk group. In contrast to new group messages, a re-transmitted group message would include a non-null value for its sequence number.

Repeater 104 or console 106 may then generate a unique message identifier, including the talk group address from the first group message and a newly generated sequence number associated with the talk group address. Note that each sequence number associated with a talk group address is a unique number. Therefore, the message identifier includes the talk group address and unique sequence number pair associated with that talk group address. Repeater 104 assigns the newly generated sequence number as a current sequence number for the first group message and forwards the first group message, with the unique message identifier, to the other radios 102b-102e associated with the talk group. Repeater 104 may also save the talk group address and the current sequence number associated with the talk group address.

When repeater 104 receives a second group message with the same talk group address and a sequence number with a null value, repeater 104 or console 106 may update the current sequence number associated with the talk group address by increasing or decreasing the current sequence number associated with the talk group address by a predefined value, for example, by increasing by one. Repeater 104 assigns the updated sequence number as the current sequence number to the second group message. In embodiments where the sequence numbers are updated by increasing or decreasing the current sequence numbers by a specific value, the receiving radios may then use the received sequence numbers to determine the number of messages associated with the talk group that were broadcast by the repeater.

Subsequent to receiving a group message, each of the other receiving radios i.e., radios 102b-102e saves the group message with the current sequence number assigned to the group message and associated with the talk group address. Each of radios 102b-102e evaluates the talk group address and the sequence number pair assigned to the received group message to determine whether or not the received group message is a duplicate message. For example, if one of radios 102b-102e had previously received a group message with the same sequence number and talk group address as the received group message, the radio may determine that the received group message is a duplicate group message and discard it. If the current sequence number is updated by increasing the value of the current sequence number by a predefined value, radios 102b-102e may determine that a received group message is a duplicate group message if the sequence number value of the received group message is less than the stored sequence number value for that talk group address; or if the current sequence number is updated by decreasing the value of the current sequence number by a predefined value, one of radios 102b-102e may determine that the received group message is a duplicate group message if the sequence number value of the received message is greater than the stored sequence number value for that talk group address.

Each of radios 102b-102e may also use the talk group address and the sequence number assigned to the incoming group message to determine if there are any group messages it may have missed. For example, if the sequence number assigned to each new group message is increased by one, when a receiving radio (for example, radio 102b) receives a message that has a sequence number value greater than one more than the value assigned to the last group message received by radio 102b with the same talk group address, radio 102b can determine that it did not receive one or more messages sent to that talk group address.

When the sending radio, in this case radio 102a, receives the talk group address and sequence number assigned to each sent message, radio 102a saves the assigned talk group address and sequence number associated with the sent message. In some embodiments, repeater 104 may append a dedicated burst after the last sub-packet of each group message, where the dedicated burst includes the talk group address and current sequence number associated with that talk group address. The sending radio may retrieve the sequence number from the dedicated burst. Radio 102a may thereafter use the assigned talk group address and sequence number to manually re-send a group message to one or more receiving radios or to respond to an incoming message query. When radio 102a resends a group message with the talk group address and sequence number, repeater 104 may validate the sequence number prior to forwarding the group message to one or more receiving radios. If a receiving radio had previously received a message with the same talk group address and sequence number pair, that receiving radio may determine that the received group message is a duplicate message and the receiving may discard the message.

When the group message is a voice message, repeater 104 may insert the current sequence number into a voice message to announce the sequence number to the talk group. In some embodiments, repeater 104 may insert the current sequence number into the voice link control message. In other embodiments, repeater 104 may append a dedicated broadcast message at the end of the voice message. The dedicated broadcast message may include one or more pairs of the group address and sequence number so that a receiving radio can detect whether there is a group message missing from multiple talk groups. For example, the dedicated broadcast message may include a group address for talk groups A, B and C and the current sequence numbers associated with talk groups A, B and C. If radio 102c is a member of talk groups A and B, subsequent to receiving the dedicated broadcast message, radio 102c can use the talk group address for talk group A and the current sequence number associated with that talk group address to determine if it missed a group message for talk group A. Similarly, radio 102c can use the talk group address for talk group B and the current sequence number associated with that talk group address to determine if it missed a group message for talk group B.

Subsequent to detecting a new sequence number associated with a group message, each receiving radio compares the talk group address and current sequence number pair associated with the received group message with the talk group address and sequence number associated with a previously received group message to determine whether or not the receiving radio missed one or more previously sent group messages. If, for example, radio 102b missed one group message, radio 102b may send a query with the talk group address and the missing sequence number to the sending radio. The sending radio may then re-send the group message, with the requested missing sequence number, via the repeater, to respond to the query request. After the group message is delivered, the message ownership may be transferred to the receiving radio that requested the missing group message to balance the load of responding to message queries among multiple radios. Note that it is possible that multiple receiving radios may detect multiple missing group messages. Therefore, the message queries from the receiving radios may be sent out using, for example, a random back-off interval. Using this method, if a first receiving radio determines that a second receiving radio already sent out a query request for the same missing message, the first receiving radio may just wait for a response to the query from the second receiving radio.

When a radio, for example radio 102d, returns to coverage area 108 or newly joins the system, subsequent to repeater 104 detecting radio 102d, repeater 104 may broadcast the current sequence numbers and associated talk group address pairs for previously sent messages for multiple talk groups. In some embodiments, the repeater may broadcast the current sequence numbers and associated talk group pairs for previously sent message for all talk groups known to the repeater. In other embodiments, the repeater may broadcast the current sequence numbers and associated talk group pairs for previously sent message for all talk groups that radio 102d subscribes to. This will enable radio 102d to detect if there are any missed messages when radio 102d receives a new incoming message from repeater 104.

Figure 2A:
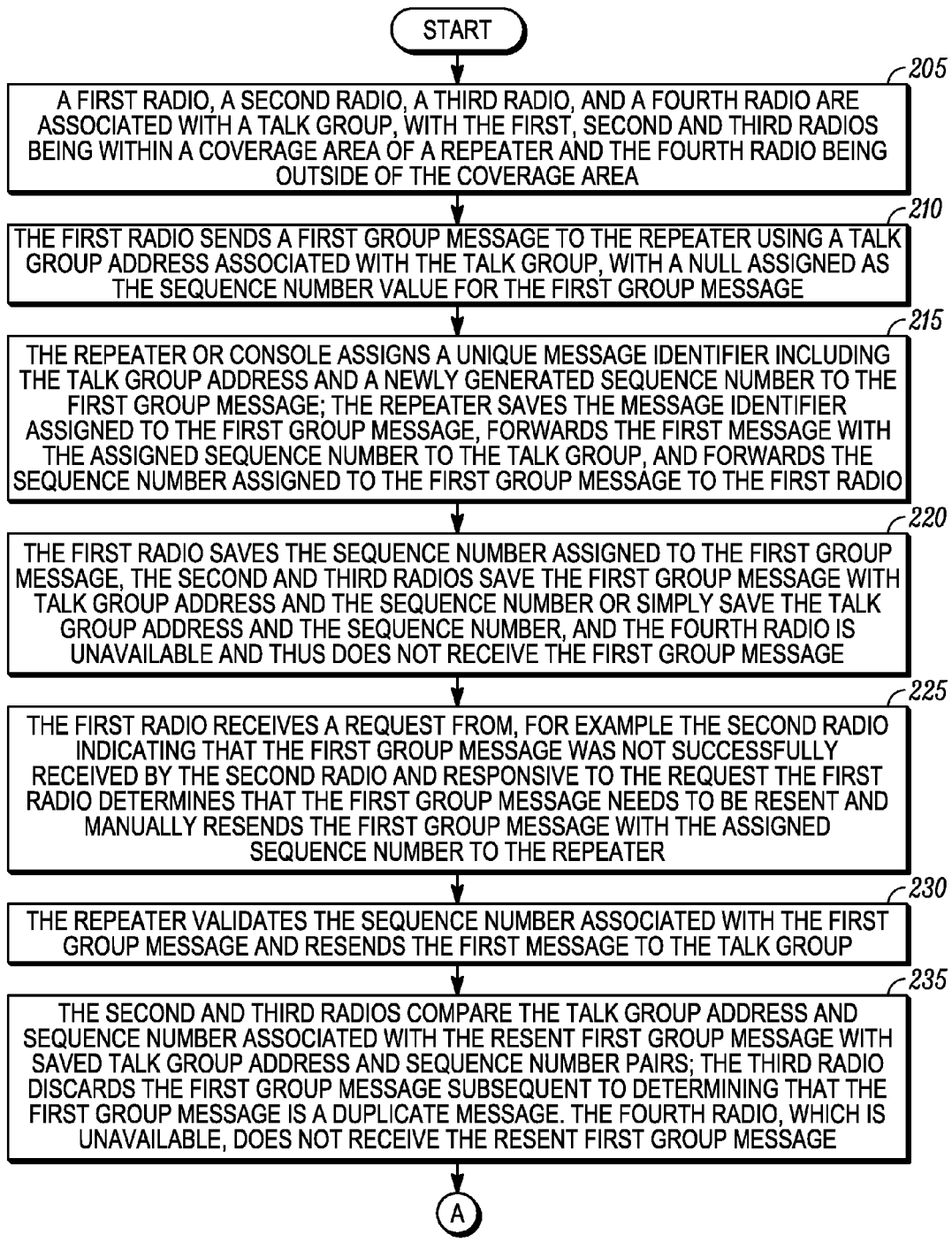
FIG. 2 is a flow diagram of how a radio detects a missed group message in accordance with some embodiments.
Figure 2B:
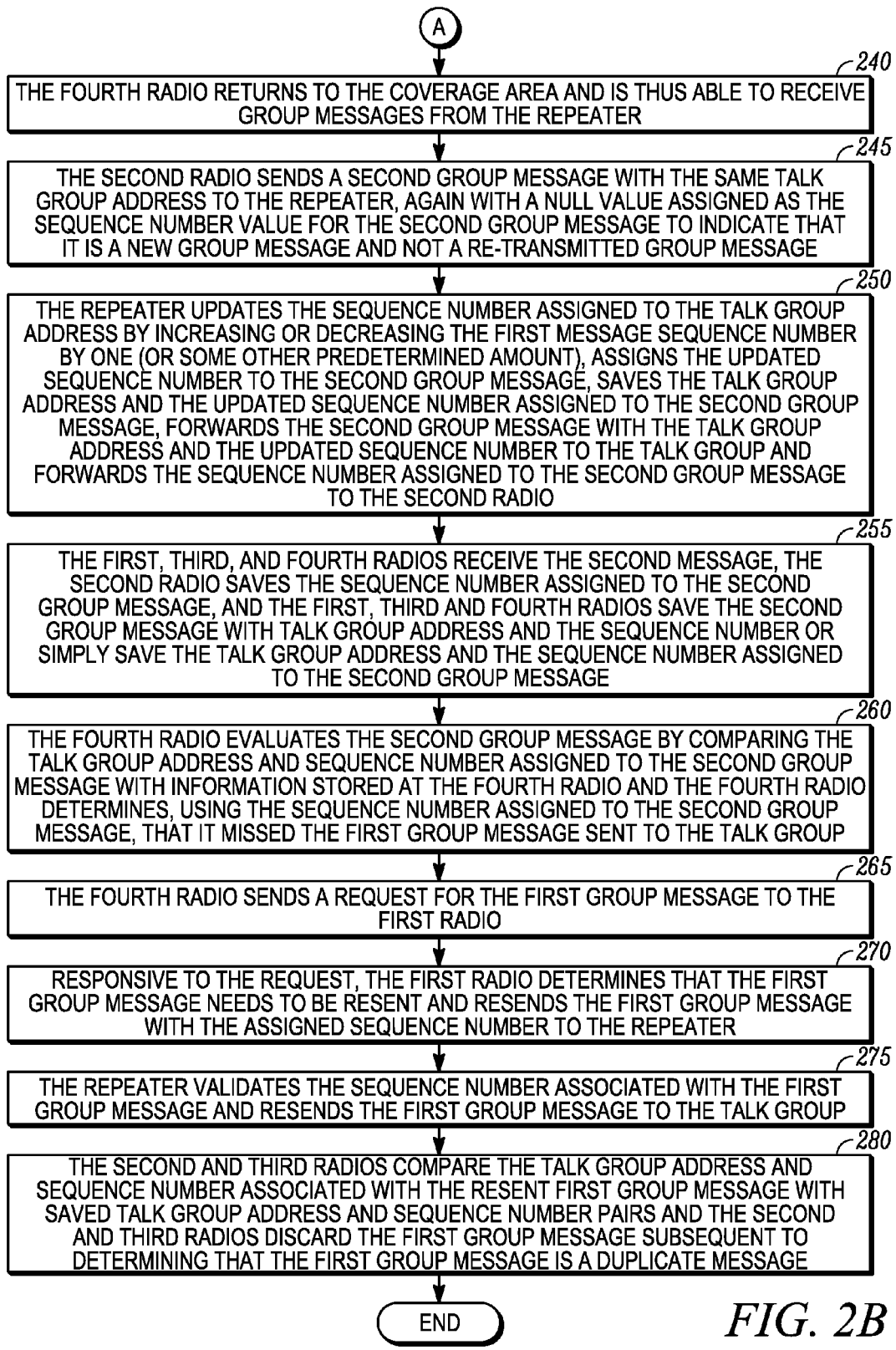

FIG. 2 is a flow diagram of how a radio detects a missed group message in accordance with some embodiments. At 205, a first radio, a second radio, a third radio, and a fourth radio are associated with a talk group, with the first, second and third radios being within a coverage area of a repeater and the fourth radio being outside of the coverage area. At 210, the first radio sends a first group message to the repeater using a talk group address associated with the talk group, with a null assigned as the sequence number value for the first group message. At 215, the repeater or console assigns a unique message identifier including the talk group address and a newly generated sequence number to the first group message; the repeater saves the message identifier assigned to the first group message, forwards the first message with the assigned sequence number to the talk group, and forwards the sequence number assigned to the first group message to the first radio. Note that the sequence number assigned to each talk group address is a unique sequence number for that talk group address. At 220, the first radio saves the sequence number assigned to the first group message, the second and third radios save the first group message with talk group address and the sequence number or simply save the talk group address and the sequence number, and the fourth radio is unavailable and thus does not receive the first group message.

At 225, the first radio receives a request from, for example the second radio indicating that the first group message was not successfully received by the second radio and responsive to the request the first radio determines that the first group message needs to be resent and manually resends the first group message with the assigned sequence number to the repeater. At 230, the repeater validates the sequence number associated with the first group message and resends the first group message to the talk group. At 235, the second and third radios compare the talk group address and sequence number associated with the resent first group message with saved talk group address and sequence number pairs; the third radio discards the first group message subsequent to determining that the first group message is a duplicate message. The fourth radio, which is unavailable, does not receive the resent first group message.

At 240, the fourth radio returns to the coverage area and is thus able to receive group messages from the repeater. At 245, the second radio sends a second group message with the same talk group address to the repeater, again with a null value assigned as the sequence number value for the second group message to indicate that it is a new group message and not a re-transmitted group message. At 250, the repeater updates the sequence number assigned to the talk group address by increasing or decreasing the first message sequence number by one (or some other predetermined amount), assigns the updated sequence number to the second group message, saves the talk group address and the updated sequence number assigned to the second group message, forwards the second group message with the talk group address and the updated sequence number to the talk group and forwards the sequence number assigned to the second group message to the second radio. At 255, the first, third, and fourth radios receive the second message, the second radio saves the sequence number assigned to the second group message, and the first, third and fourth radios save the second group message with talk group address and the sequence number or simply save the talk group address and the sequence number assigned to the second group message. At 260, the fourth radio evaluates the second group message by comparing the talk group address and sequence number assigned to the second group message with information stored at the fourth radio and the fourth radio determines, using the sequence number assigned to the second group message, that it missed the first group message sent to the talk group. At 265, the fourth radio sends a request for the first group message to the first radio. At 270, responsive to the request, the first radio determines that the first group message needs to be resent and resends the first group message with the assigned sequence number to the repeater. At 275, the repeater validates the sequence number associated with the first group message and resends the first group message to the talk group. At 280, the second and third radios compare the talk group address and sequence number associated with the resent first group message with saved talk group address and sequence number pairs and the second and third radios discard the first group message subsequent to determining that the first group message is a duplicate message.

Figure 3:
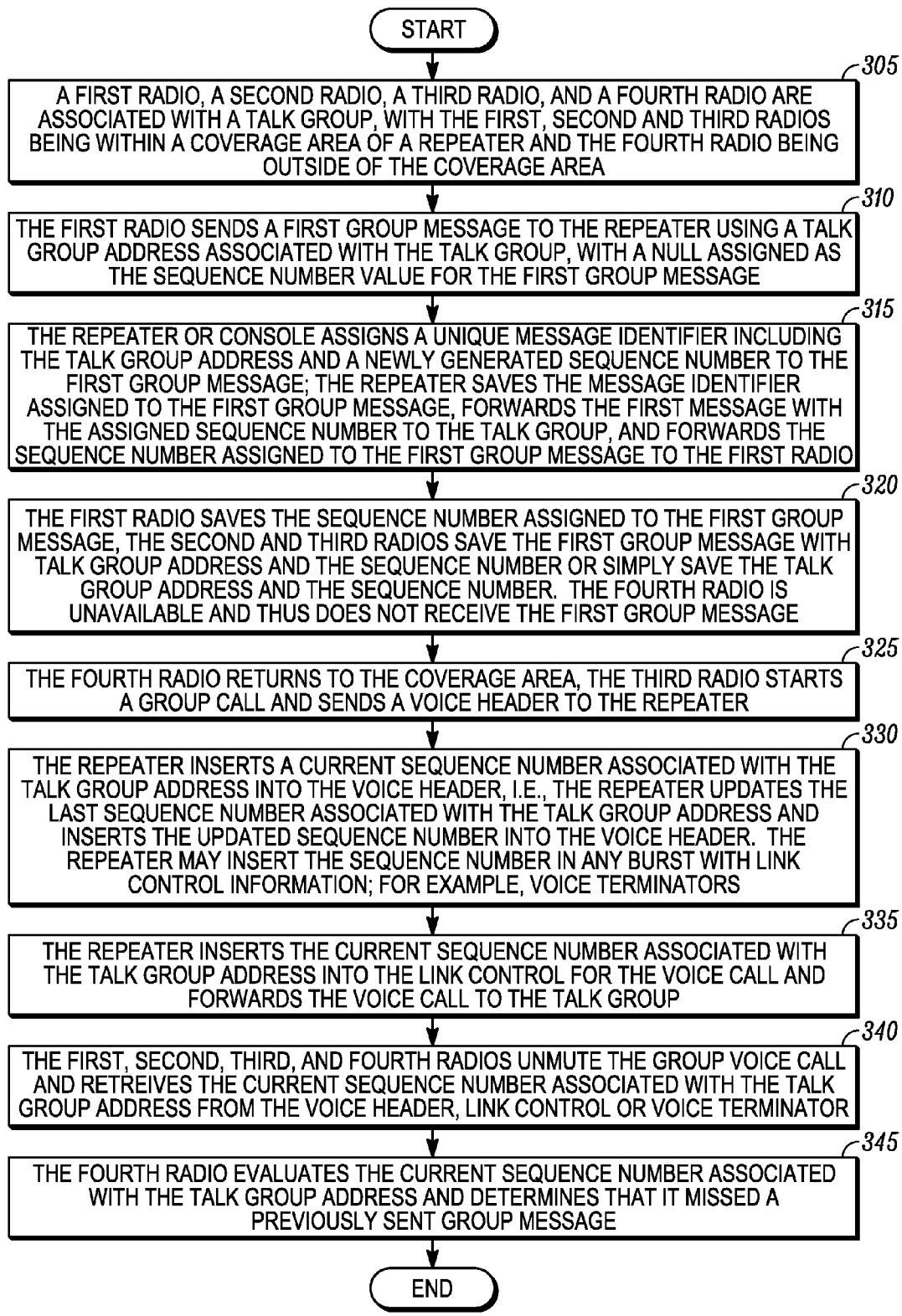
FIG. 3 is another flow diagram of how a radio detects a missed group message in accordance with some embodiments.

FIG. 3 is another flow diagram of how a radio detects a missed group message in accordance with some embodiments. At 305, a first radio, a second radio, a third radio, and a fourth radio are associated with a talk group, with the first, second and third radios being within a coverage area of a repeater and the fourth radio being outside of the coverage area. At 310, the first radio sends a first group message to the repeater using a talk group address associated with the talk group, with a null assigned as the sequence number value for the first group message. At 315, the repeater or console assigns a unique message identifier including the talk group address and a newly generated sequence number to the first group message; the repeater saves the message identifier assigned to the first group message, forwards the first message with the assigned sequence number to the talk group, and forwards the sequence number assigned to the first group message to the first radio. Note that the sequence number assigned to each talk group is a unique sequence number for that talk group. At 320, the first radio saves the sequence number assigned to the first group message, the second and third radios save the first group message with talk group address and the sequence number or simply save the talk group address and the sequence number. The fourth radio is unavailable and thus does not receive the first group message.

At 325, the fourth radio returns to the coverage area, the third radio starts a group call and sends a voice header to the repeater. At 330, the repeater inserts a current sequence number associated with the talk group address into the voice header, i.e., the repeater updates the last sequence number associated with the talk group address- and inserts the updated sequence number into the voice header. The repeater may insert the sequence number in any burst with link control information; for example, voice terminators. At 335, the repeater inserts the current sequence number associated with the talk group address into the link control for the voice call and forwards the voice call to the talk group. At 340, the first, second, third, and fourth radios unmute the group voice call and retrieve the current sequence number associated with the talk group address from the voice header, link control or voice terminator. At 345, the fourth radio evaluates the current sequence number associated with the talk group address and determines that it missed a previously sent group message.

Figure 4:
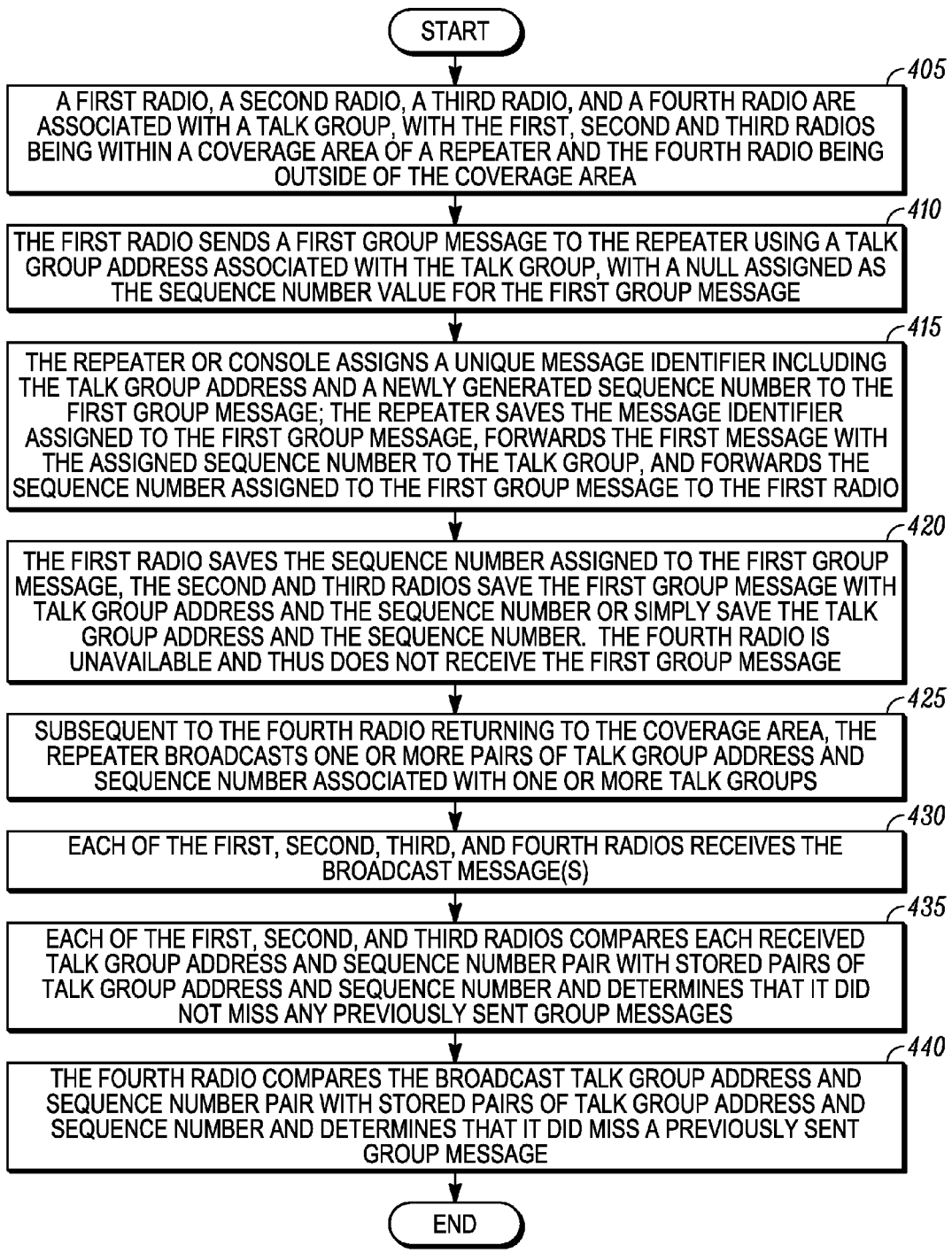
FIG. 4 is another flow diagram of how a radio detects a missed group message in accordance with some embodiments.

FIG. 4 is another flow diagram of how a radio detects a missed group message in accordance with some embodiments. At 405, a first radio, a second radio, a third radio, and a fourth radio are associated with a talk group, with the first, second and third radios being within a coverage area of a repeater and the fourth radio being outside of the coverage area. At 410, the first radio sends a first group message to the repeater using a talk group address associated with the talk group, with a null assigned as the sequence number value for the first group message. At 415, the repeater or console assigns a unique message identifier including the talk group address and a newly generated sequence number to the first group message; the repeater saves the message identifier assigned to the first group message, forwards the first message with the assigned sequence number to the talk group, and forwards the sequence number assigned to the first group message to the first radio. Note that the sequence number assigned to each talk group is a unique sequence number for that talk group. At 420, the first radio saves the sequence number assigned to the first group message, the second and third radios save the first group message with talk group address and the sequence number or simply save the talk group address and the sequence number. The fourth radio is unavailable and thus does not receive the first group message.

At 425, subsequent to the fourth radio returning to the coverage area, the repeater broadcasts one or more pairs of talk group address and sequence number associated with one or more talk groups. At 430, each of the first, second, third, and fourth radios receives the broadcast message(s). At 435, each of the first, second, and third radios compares each received talk group address and sequence number pair with stored pairs of talk group address and sequence number and determines that it did not miss any previously sent group messages. At 440, the fourth radio compares the broadcast talk group address and sequence number pair with a stored pairs of talk group address and sequence number and determines that it did miss a previously sent group message.

Figure 5A:
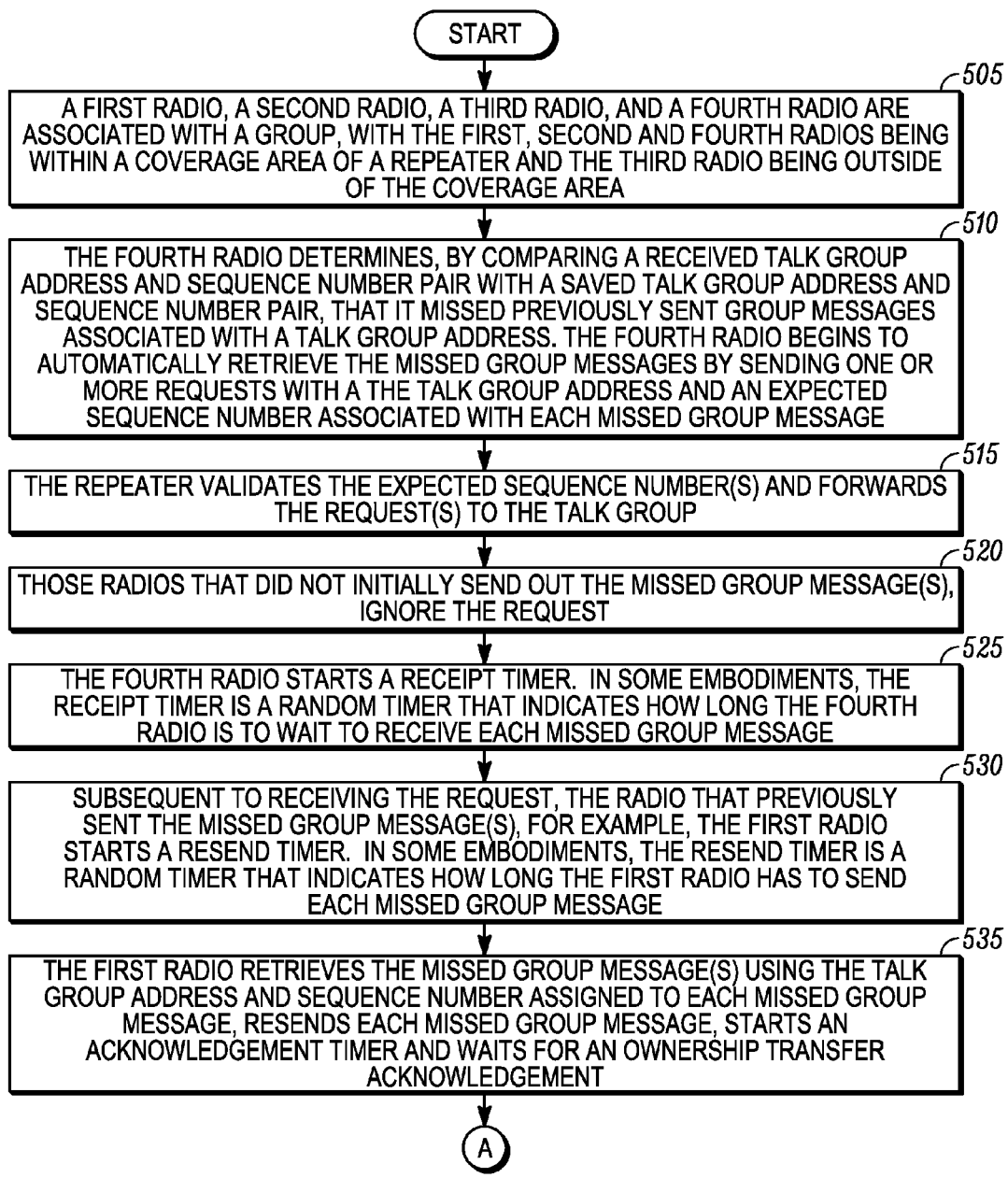
FIG. 5 is a flow diagram of how a radio retrieves a missed group message in accordance with some embodiments.
Figure 5B:
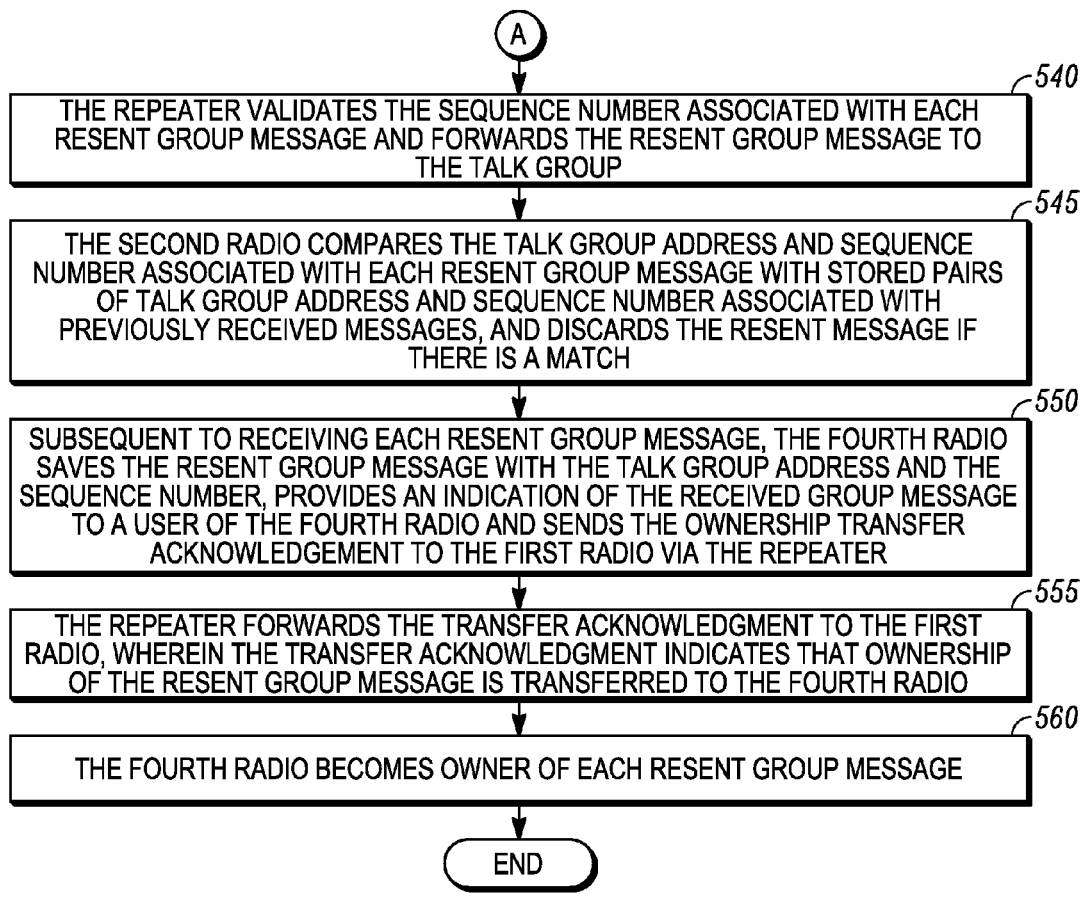

FIG. 5 is a flow diagram of how a radio retrieves a missed group message in accordance with some embodiments. At 505, a first radio, a second radio, a third radio, and a fourth radio are associated with a group, with the first, second and fourth radios being within a coverage area of a repeater and the third radio being outside of the coverage area. At 510, the fourth radio determines, by comparing a received talk group address and sequence number pair with a saved talk group address and sequence number pair, that it missed previously sent group messages associated with a talk group address. The fourth radio begins to automatically retrieve the missed group messages by sending one or more requests with the talk group address and an expected sequence number associated with each missed group message. For example, if the fourth radio missed three messages, the fourth radio may send out a first request with the talk group address and the expected sequence number for the first or earliest of the three missed message, it may send out a second request with the talk group address and the expected sequence number for the second of the three missed messages and it may send out a third request with the talk group address and the expected sequence number for the third or latest of the three missed messages. Alternatively, the fourth radio may send out one request with the talk group address and the expected sequence numbers for all three messages. At 515, the repeater validates the expected sequence number(s) and forwards the request(s) to the talk group. At 520, those radios that did not initially send out the missed group message(s) ignore the request. At 525, the fourth radio starts a receipt timer. In some embodiments, the receipt timer is a random timer that indicates how long the fourth radio is to wait to receive each missed group message. At 530, subsequent to receiving the request, the radio that previously sent the missed group message(s), for example, the first radio starts a resend timer. In some embodiments, the resend timer is a random timer that indicates how long the first radio has to send each missed group message. At 535, the first radio retrieves the missed group message(s) using the talk group address and sequence number assigned to each missed group message, resends each missed group message, starts an acknowledgement timer and waits for an ownership transfer acknowledgement. At 540, the repeater validates the sequence number associated with each resent group message and forwards the resent group message to the talk group. At 545, the second radio compares the talk group address and sequence number associated with each resent group message with stored pairs of talk group address and sequence number associated with previously received messages, and discards the resent message if there is a match. In other words, if the current sequence number is generated by increasing the value of the previous sequence number associated with the talk group address and the current sequence number assigned to a resent group message is smaller than a saved sequence number associated with the talk group address, the second radio can determine that it previously received the group message. At 550, subsequent to receiving each resent group message, the fourth radio saves the resent group message with the talk group address and the sequence number, provides an indication of the received group message to a user of the fourth radio and sends the ownership transfer acknowledgement to the first radio via the repeater. At 555, the repeater forwards the transfer acknowledgment to the first radio, wherein the transfer acknowledgment indicates that ownership of the resent group message is transferred to the fourth radio. At 560, the fourth radio becomes owner of each resent group message.

Figure 6:
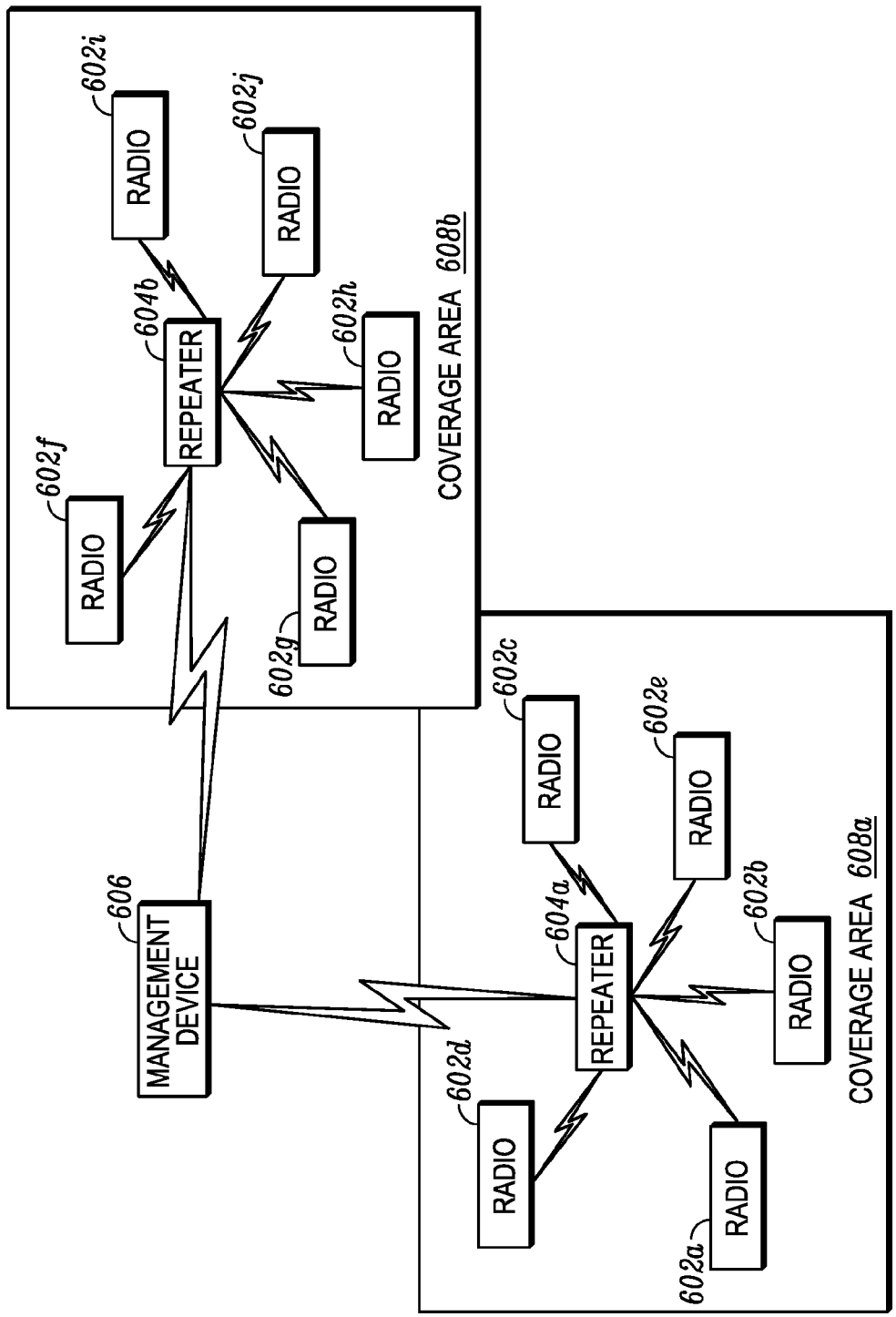
FIG. 6 is another block diagram of a system used in accordance with some embodiments.

FIG. 6 is another block diagram of a system used in accordance with some embodiments. System 600 includes radios 602 (i.e., radios 602a-602j) and two or more repeaters 604 (i.e., repeaters 604a and 604b), and management device 606. Similar to FIG. 1, radios 602 may be, for example, portable radios, mobile radios, or fixed station radios, used to communicate with other radios and interface to a network. Radios 602 may include a group message feature, wherein when two or more radios are associated with a talk group, a voice or data message sent from each radio associated with the talk group is broadcast to all radios in the talk group. Repeaters 604 are network components that provide radio frequency coverage to, for example, coverage areas 608a and 608b. When each repeater 604 receives a signal/message from one of radios 602, repeater 604 re-transmits/broadcasts the message to the intended radios in the talk group.

When, for example, radio 602a sends a first group message, the first group message is initially sent from radio 602a to repeater 604a. A sequence number value associated with the first group message is initially set to a null value, thereby indicating to repeater 604a that the first group message is a new message that has not been previously transmitted to the talk group. Repeater 604a requests that management device 606 generates a message identifier, i.e., including the talk group address and a unique sequence number for the group message. The message identifier generated by management device 606 may be a unique system-wide number, i.e., the same message identifier (i.e., the same talk group address and sequence number pair) may not be used by another repeater in the system. For example, if repeater 604b is sending group messages to the same or different radios in a different talk group, repeater 604b may not use the same talk group address and sequence number pair being used by repeater 604a. Subsequent to receiving an assigned sequence number from management device 606, repeater 604a forwards the message with the talk group address and the assigned sequence number to all the radios in the talk group. Management device 606 may save each group message with the talk group address and the assigned sequence number for a predefined period of time.

When each of receiving radios sends a query for a missed group message, management device 606 is configured to send the missed message to the radio after the query is received by the repeater. For example, when a first radio sends a query request to management device 606 via repeater 604a, the query request may include the talk group address and the last sequence number received by the first radio. Management device 606 may compare the last sequence number included in the query request with the current sequence number associated with the talk group address and management device 606 is configured to determine how many messages and which type of messages the first radio missed. Subsequent to determining the number and types of missed message, management device 606 may then send all of the missed messages to the first radio, with each of the sent messages including the talk group address and sequence number assigned to that message.

In some embodiments, the functions of management device 606 may be implemented in one or more components in repeater 604. Therefore, in these embodiments, there is no need for a separate management device. In some embodiments, an administrator may use the information stored in management device 606 to manually announce the sequence numbers associated with each talk group to members of the talk group. In other embodiments, a monitoring program may retrieve the information stored in management device 606 and automatically announce the sequence numbers associated with each talk group to radios in the talk group intermittently or periodically.

Figure 7:
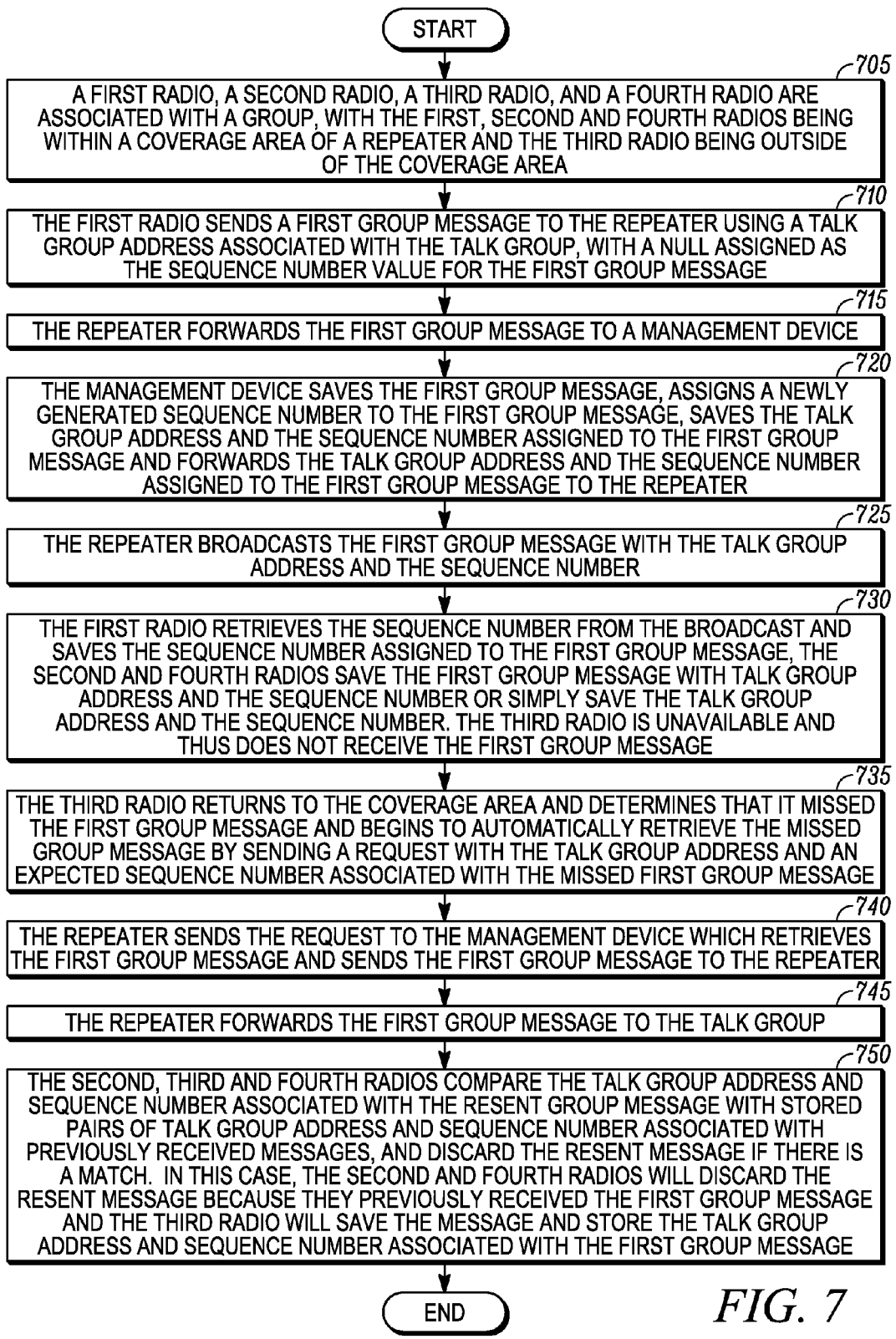
FIG. 7 is another flow diagram of how a radio retrieves a missed group message in accordance with some embodiments.

FIG. 7 is another flow diagram of how a radio retrieves a missed group message in accordance with some embodiments. At 705, a first radio, a second radio, a third radio, and a fourth radio are associated with a group, with the first, second and fourth radios being within a coverage area of a repeater and the third radio being outside of the coverage area. At 710, the first radio sends a first group message to the repeater using a talk group address associated with the talk group, with a null assigned as the sequence number value for the first group message. At 715, the repeater forwards the first group message to a management device. At 720, the management device saves the first group message, assigns a newly generated sequence number to the first group message, saves the talk group address and the sequence number assigned to the first group message and forwards the talk group address and the sequence number assigned to the first group message to the repeater. At 725, the repeater broadcasts the first group message with the talk group address and the sequence number. At 730, the first radio retrieves the sequence number from the broadcast and saves the sequence number assigned to the first group message, the second and fourth radios save the first group message with talk group address and the sequence number or simply save the talk group address and the sequence number. The third radio is unavailable and thus does not receive the first group message.

At 735, the third radio returns to the coverage area and determines that it missed the first group message and begins to automatically retrieve the missed group message by sending a request with the talk group address and an expected sequence number associated with the missed first group message. At 740, the repeater sends the request to the management device which retrieves the first group message and sends the first group message to the repeater. At 745, the repeater forwards the first group message to the talk group. At 750, the second, third and fourth radios compare the talk group address and sequence number associated with the resent group message with stored pairs of talk group address and sequence number associated with previously received messages, and discard the resent message if there is a match. In this case, the second and fourth radios will discard the resent message because they previously received the first group message and the third radio will save the message and store the talk group address and sequence number associated with the first group message.

In some embodiments, for example, in a system where there is no management device, the sender of the group message may not be allowed to delete the group message for a predefined time period after the message is sent in order for missed group messages to be retrieved at a later time. This may impact the storage on the sending radio, for example, if the sending radio sends out a large number of group messages within the predefined time period. In other embodiments, for example, in a system where there is a management device, the sender of the group message may be allowed to delete a group message after the group message has been sent and stored on the management device. This will enable receiving radios to retrieve the missed group messages from the management device.

Figure 8:
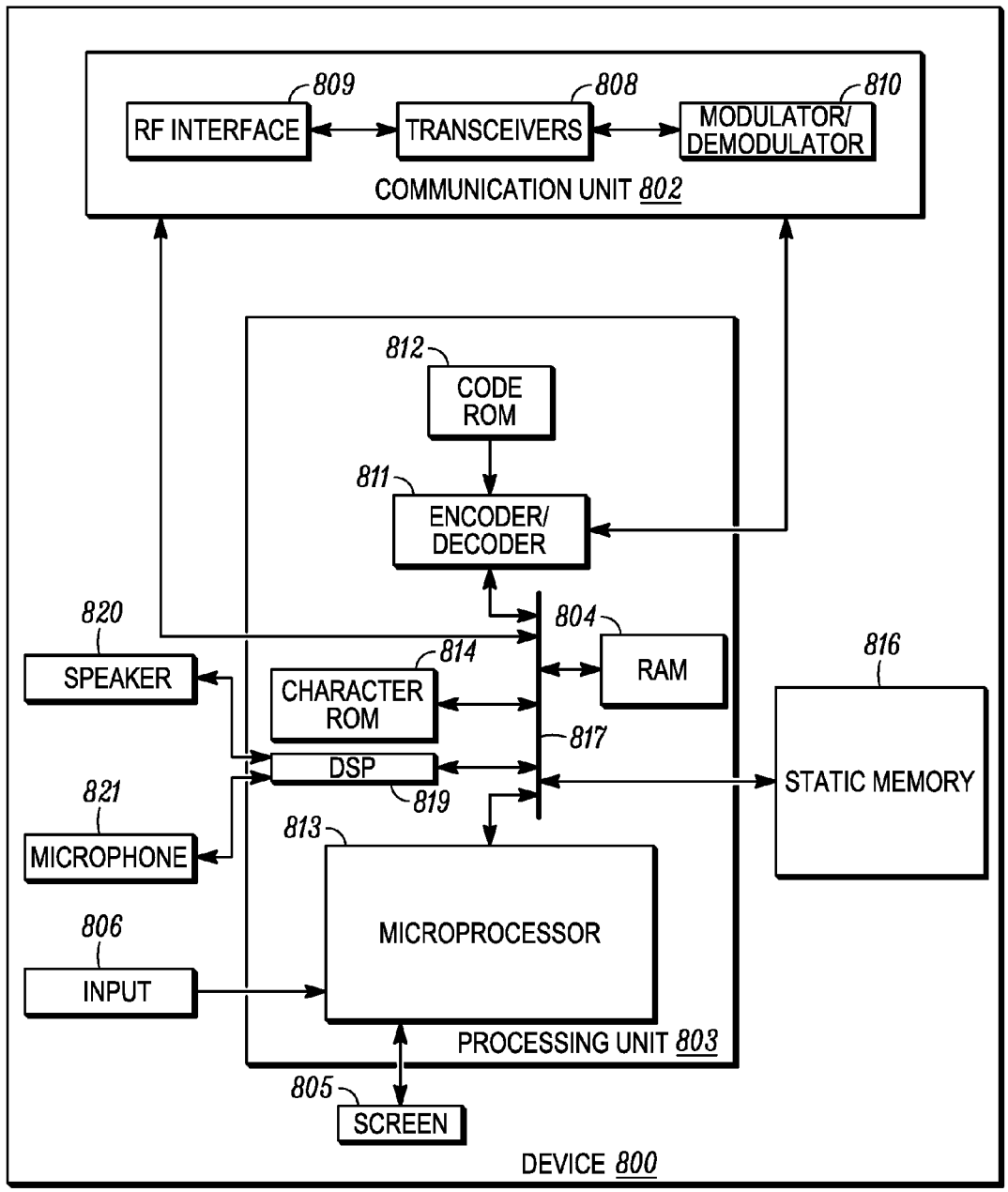
FIG. 8 is a block diagram of an apparatus configured in accordance with some embodiments.

FIG. 8 is a block diagram of a device 800 used in accordance with some embodiments. The device 800 includes a communications unit 802 coupled to a common data and address bus 817 of a processing unit 803. The device 800 may also include an input unit (e.g., keypad, pointing device, etc.) 806, an output transducer unit (e.g., speaker) 820, an input transducer unit (e.g., a microphone) (MIC) 821, and a display screen 805, each coupled to be in communication with the processing unit 803.

The processing unit 803 may include an encoder/decoder 811 with an associated code ROM 812 for storing data for encoding and decoding voice, data, control, or other signals that may be transmitted or received by the mobile station. The processing unit 803 may further include a microprocessor 813 coupled, by the common data and address bus 817, to the encoder/decoder 811, a character ROM 814, a RAM 804, and a static memory 816. The processing unit 803 may also include a digital signal processor (DSP) 819, coupled to the speaker 820, the microphone 821, and the common data and address bus 817, for operating on audio signals received from one or more of the communications unit 802, the static memory 816, and the microphone 821.

The communications unit 802 may include an RF interface 809 configurable to communicate with network components, and other user equipment within its communication range. The communications unit 802 may include one or more broadband and/or narrowband transceivers 808, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. The communications unit 802 may include one or more local area network or personal area network transceivers such as Wi-Fi transceiver perhaps operating in accordance with an IEEE 802.11 standard (e.g., 802.11a, 802.11b, 802.11g), or a Bluetooth transceiver, for subscriber device to subscriber device communications. The transceivers may be coupled to a combined modulator/demodulator 810 that is coupled to the encoder/decoder 811. The character ROM 814 stores code for decoding or encoding data such as control, request, or instruction messages, channel change messages, and/or data or voice messages that may be transmitted or received by the mobile station. Static memory 816 may store operating code associated with processing a missed group messages in accordance with this disclosure, including the steps set forth in FIGS. 2-5, 7, and 9.

Figure 9:
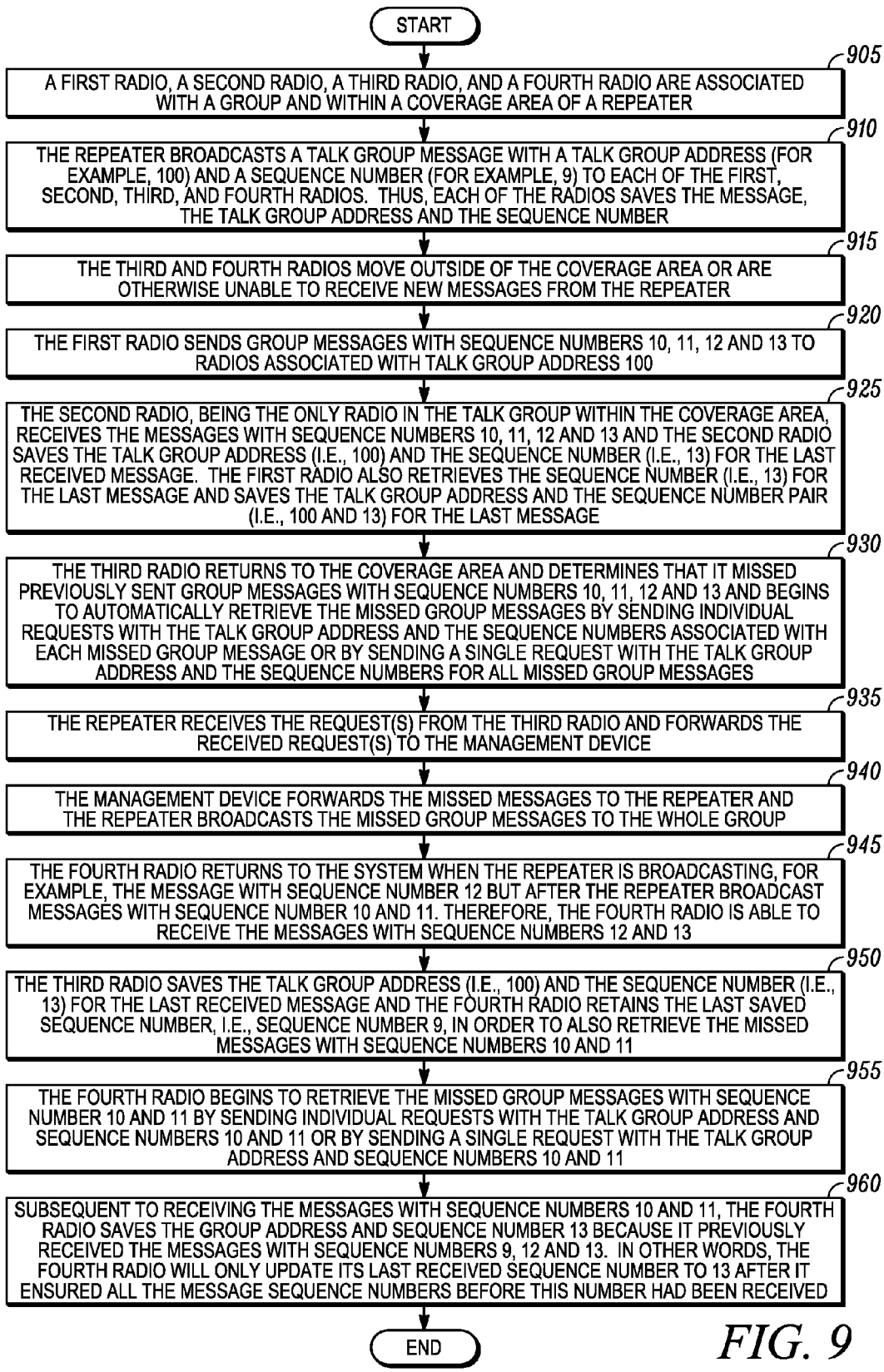
FIG. 9 is another flow diagram of how a radio retrieves a missed group message in accordance with some embodiments.

FIG. 9 is another flow diagram of how a radio retrieves a missed group message in accordance with some embodiments. At 905, a first radio, a second radio, a third radio, and a fourth radio are associated with a group and within a coverage area of a repeater. At 910, the repeater broadcasts a talk group message with a talk group address (for example, 100) and a sequence number (for example, 9) to each of the first, second, third, and fourth radios. Thus, each of the radios saves the message, the talk group address and the sequence number. At 915, the third and fourth radios move outside of the coverage area or are otherwise unable to receive new messages from the repeater. At 920, the first radio sends group messages with sequence numbers 10, 11, 12 and 13 to radios associated with talk group address 100.

At 925, the second radio, being the only radio in the talk group within the coverage area, receives the messages with sequence numbers 10, 11, 12 and 13 and the second radio saves the talk group address (i.e., 100) and the sequence number (i.e., 13) for the last received message. The first radio also retrieves the sequence number (i.e., 13) for the last message and saves the talk group address and the sequence number pair (i.e., 100 and 13) for the last message. At 930, the third radio returns to the coverage area and determines that it missed previously sent group messages with sequence numbers 10, 11, 12 and 13 and begins to automatically retrieve the missed group messages by sending individual requests with the talk group address and the sequence numbers associated with each missed group message or by sending a single request with the talk group address and the sequence numbers for all missed group messages.

At 935, the repeater receives the request(s) from the third radio and forwards the received request(s) to the management device. At 940, the management device forwards the missed messages to the repeater and the repeater broadcasts the missed group messages to the whole group. At 945, the fourth radio returns to the system when the repeater is broadcasting, for example, the message with sequence number 12 but after the repeater broadcast messages with sequence number 10 and 11. Therefore, the fourth radio is able to receive the messages with sequence numbers 12 and 13. At 950, the third radio saves the talk group address (i.e., 100) and the sequence number (i.e., 13) for the last received message and the fourth radio retains the last saved sequence number, i.e., sequence number 9, in order to also retrieve the missed messages with sequence numbers 10 and 11. At 955, the fourth radio begins to retrieve the missed group messages with sequence number 10 and 11 by sending individual requests with the talk group address and sequence numbers 10 and 11 or by sending a single request with the talk group address and the sequence numbers 10 and 11. At 960, subsequent to receiving the messages with sequence numbers 10 and 11, the fourth radio saves the group address and sequence number 13 because it previously received the messages with sequence numbers 9, 12 and 13. In other words, the fourth radio will only update its last received sequence number to 13 after it ensured all the message sequence numbers before this number had been received.

Figure 10:
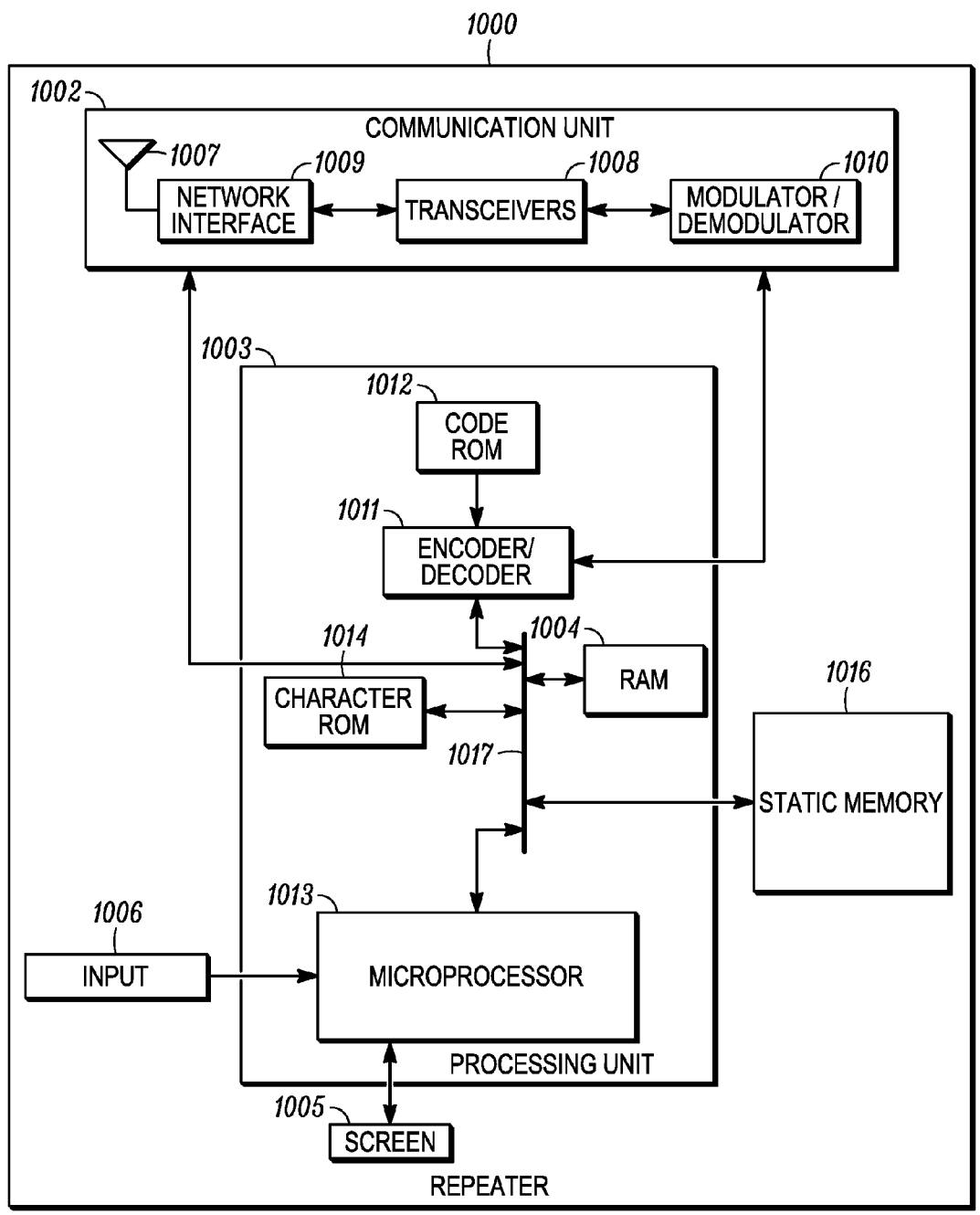
FIG. 10 is a block diagram of a repeater configured in accordance with some embodiments.

FIG. 10 is a block diagram of a repeater used in accordance with some embodiments. The repeater 1000 includes a communications unit 1002 coupled to a common data and address bus 1017 of a processing unit 1003. The repeater 1000 may also include an input unit (e.g., keypad, pointing device, etc.) 1006 and a display screen 1005, each coupled to be in communication with the processing unit 1003.

The processing unit 1003 may include an encoder/decoder 1011 with an associated code ROM 1012 for storing data for encoding and decoding voice, data, control, or other signals that may be transmitted or received by the repeater. The processing unit 1003 may further include a microprocessor 1013 coupled, by the common data and address bus 1017, to the encoder/decoder 1011, a character ROM 1014, a RAM 1004, and a static memory 1016.

The communications unit 1002 may include a network interface 1009 configurable to communicate with network components (for example, the management device), and other user equipment (for example, subscriber units) within its communication range. The communications unit 1002 may include one or more broadband and/or narrowband transceivers 1008, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Additionally or alternatively, the communications unit 1002 may include one or more local area network or personal area network transceivers such as Wi-Fi transceiver perhaps operating in accordance with an IEEE 802.11 standard (e.g., 802.11a, 802.11b, 802.11g), or a Bluetooth transceiver, for subscriber device to subscriber device communications. Additionally or alternatively, the communications unit 1002 may additionally or alternatively include one or more wire-lined transceivers 1008, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 1010 that is coupled to the encoder/decoder 1011. The character ROM 1014 stores code for decoding or encoding data such as control, request, or instruction messages, channel change messages, and/or data or voice messages that may be transmitted or received by the mobile station. Static memory 1016 may store operating code associated with processing a missed group messages in accordance with this disclosure, including the steps set forth in FIGS. 2-5, 7, and 9.

The transceiver is configured to receive a first group message directed to a talk group and including a talk group address uniquely identifying the talk group. The processor 1003 is configured to assign a first unique message identifier including a generated first sequence number and the talk group address to the first group message when the first group message is in a message sequence associated with the talk group. The transceiver 1008 is further configured to broadcast the first group message with the first unique message identifier to the talk group and receive a second group message directed to the talk group. The processor 1003 is further configured to generate a second sequence number by one of incrementing or decrementing the generated first sequence number assigned to the first group message by a predetermined amount, and assign a second unique message identifier including the second sequence number and the talk group address to the second group message. The transceiver also broadcasts the second group message with the second sequence number and the second unique talk group address to the talk group. The first sequence number assigned to the first group message and the second sequence number assigned to the second group message may be used by a receiving radio member of the talk group to determine if the receiving radio failed to receive one or more group messages broadcast by the repeater or if one or more received group messages broadcast by the repeater is a duplicate message. The memory 1016 is configured to store operating code for operating the repeater and/or data, for example, the sequence numbers generated and/or used by the repeater, and/or for performing any one or more of the repeater steps and/or message transmissions or receptions set forth in FIGS. 2-5, 7, and 9.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 20%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, the mobile stations of FIGS. 1 and/or 2 may comprise a set of instructions (perhaps stored in a volatile or non-volatile computer readable medium) that, when executed by a processor, perform some or all of the steps set forth in FIGS. 3-4 and the corresponding text. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising,
    receiving, by a repeater, a first group message directed to a talk group and including a talk group address uniquely identifying the talk group;
    assigning, by the repeater, a first unique message identifier including a generated first sequence number and the talk group address to the first group message when the first group message is in a message sequence associated with the talk group;
    broadcasting, by the repeater, the first group message with the first unique message identifier to the talk group;
    receiving, by the repeater, a second group message directed to the talk group;
    generating a second sequence number by one of incrementing or decrementing the generated first sequence number assigned to the first group message by a predetermined amount, and assigning a second unique message identifier including the second sequence number and the talk group address to the second group message; and
    broadcasting, by the repeater, the second group message with the second sequence number to the talk group, wherein the first sequence number assigned to the first group message and the second sequence number assigned to the second group message is used by a receiving radio member of the talk group to determine if the receiving radio failed to receive one or more group messages broadcast by the repeater or if one or more received group messages is a duplicate message;
    wherein broadcasting by the repeater comprises appending a dedicated burst after a last sub-packet of a data group message, the dedicated burst including at least one of the first unique message identifier assigned to the first group message and the second unique message identifier assigned to the second group message.

2. The method of claim 1, wherein the first group message and the second group message is one of a voice message or a data message, wherein when a voice group message is received by the repeater, the repeater appends a dedicated broadcast message at the end of the voice group message, the dedicated broadcast message including one or more pairs of a group address and the sequence number to enable the receiving radio to detect whether there is a group message missing from multiple groups.

3. The method of claim 1, wherein the first group message and the second group message is one of a voice message or a data message, wherein when a voice group message is received by the repeater, the repeater inserts the first sequence number into the voice group message.

4. The method of claim 1, wherein when the receiving radio determines that the first group message was missed, the receiving radio sends a query with the first unique message identifier to the repeater and the repeater broadcasts the query to the talk group so that a sending radio can respond to the query.

5. The method of claim 4, wherein the sending radio uses the first unique message identifier to retrieve the first group message and the sending radio forwards the retrieved first group message to the repeater.

6. The method of claim 5, wherein the repeater validates the first sequence number included in the first unique message identifier associated with the retrieved first group message before rebroadcasting the retrieved first group message to the talk group.

7. The method of claim 1, wherein the receiving radio evaluates an incoming sequence number assigned to an incoming group message to determine whether the incoming message is a duplicate message,
    wherein if a sequence number is assigned to a talk group message by incrementing a current sequence number assigned to the talk group by a predetermined amount and the incoming sequence number is smaller than a saved sequence number associated with the talk group, the incoming message is determined to be a duplicate message, or
    wherein if the sequence number is assigned to the talk group message by decrementing the current sequence number assigned to the talk group by a predetermined amount and the incoming sequence number is greater than the saved sequence number associated with the talk group, the incoming message is determined to be a duplicate message.

8. The method of claim 1, wherein the receiving radio evaluates an incoming sequence number assigned to an incoming group message to determine whether the receiving radio missed a prior group message,
    wherein if a sequence number is assigned to a talk group message by incrementing a current sequence number assigned to the talk group by a predetermined amount and if the incoming sequence number assigned to the incoming group message is greater than a sequence number assigned to a last received group message associated with a same talk group by more than the predetermined amount, the receiving radio determines that at least one group message was missed, or
    wherein if the sequence number is assigned to the talk group message by decrementing a current sequence number assigned to the talk group by a predetermined amount and if the incoming sequence number assigned to the incoming group message is less than a sequence number assigned to the last received group message associated with a same talk group by more than the predetermined amount, the receiving radio determines that at least one group message was missed.

9. The method of claim 1, further comprising broadcasting, by the repeater, one or more pairs of the unique talk group address and sequence number of a last sent group message responsive to detecting a new radio within a coverage area in which the repeater operates.

10. The method of claim 1, wherein the assigning the first unique message identifier comprises the repeater requesting that a management device generate the first unique message identifier.

11. The method of claim 10, wherein the management device is configured to keep track of all sequence numbers assigned to all talk groups.

12. A repeater comprising:
a wireless transceiver;
a memory; and
a processor configured to:
receive, via the wireless transceiver, a first group message directed to a talk group and including a talk group address uniquely identifying the talk group;
assign a first unique message identifier including a generated first sequence number and the talk group address to the first group message when the first group message is in a message sequence associated with the talk group;
broadcast, via the transceiver, the first group message with the first unique message identifier to the talk group;
receive, via the transceiver, a second group message directed to the talk group;
generate a second sequence number by one of incrementing or decrementing the generated first sequence number assigned to the first group message by a predetermined amount, and assign a second unique message identifier including the second sequence number and the talk group address to the second group message; and
broadcast, via the transceiver, the second group message with the second sequence number to the talk group, wherein the first sequence number assigned to the first group message and the second sequence number assigned to the second group message is used by a receiving radio member of the talk group to determine if the receiving radio failed to receive one or more group messages broadcast by the repeater or if one or more received group messages is a duplicate message;
wherein the processor is further configured to append a dedicated broadcast message at the end of a group voice call, the dedicated broadcast message including one or more pairs of a group address and the sequence number to enable the receiving radio to detect whether there is a group message missing from multiple groups.

13. The repeater of claim 12, wherein the processor is configured to:
insert at least one of the first sequence number and the second sequence number into at least one of a voice header, a voice terminator or a voice link control; or
append a dedicated burst after a last sub-packet of a data group message, the dedicated burst including at least one of the first unique message identifier assigned to the first group message and the second unique message identifier assigned to the second group message.

14. The repeater of claim 12, wherein the transceiver is configured to receive a resent first group message and the processor is configured to validate the first sequence number included in the resent first group message before rebroadcasting the resent first group message to the talk group.

15. The repeater of claim 12, wherein the transceiver is configured to rebroadcast one or more pairs of the unique talk group address and the sequence number of a last sent group message responsive to detecting a new radio within a coverage area in which the repeater operates.

16. The repeater of claim 12, wherein the transceiver is configured to send a request to a management device for the management device to generate the first unique message identifier.

17. The repeater of claim 12, further comprising a management device configured to generate at least one of the first unique message identifier and the second unique message identifier.

18. The repeater of claim 17, wherein the management device is configured to at least one of:
keep track of all sequence numbers assigned to all talk groups,
store all the messages sent to the repeater for a predefined period of time,
determine a number of missed messages and a type of a missed message based on a sequence number included in a query request received by the repeater, and
send out a missed group message in response to the query request.

19. A method comprising,
receiving, by a repeater, a first group message directed to a talk group and including a talk group address uniquely identifying the talk group;
assigning, by the repeater, a first unique message identifier including a generated first sequence number and the talk group address to the first group message when the first group message is in a message sequence associated with the talk group;
broadcasting, by the repeater, the first group message with the first unique message identifier to the talk group;
receiving, by the repeater, a second group message directed to the talk group;
generating a second sequence number by one of incrementing or decrementing the generated first sequence number assigned to the first group message by a predetermined amount, and assigning a second unique message identifier including the second sequence number and the talk group address to the second group message; and
broadcasting, by the repeater, the second group message with the second sequence number to the talk group, wherein the first sequence number assigned to the first group message and the second sequence number assigned to the second group message is used by a receiving radio member of the talk group to determine if the receiving radio failed to receive one or more group messages broadcast by the repeater or if one or more received group messages is a duplicate message;
wherein when the receiving radio determines that the first group message was missed, the receiving radio sends a query with the first unique message identifier to the repeater and the repeater sends the query to the management device for validation and for the management device to respond to the query.

* * * * *